US009366752B2

(12) United States Patent
Ruh

(10) Patent No.: US 9,366,752 B2
(45) Date of Patent: Jun. 14, 2016

(54) PROXIMITY SENSOR WITH ASYMMETRIC OPTICAL ELEMENT

(75) Inventor: Richard Ruh, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1266 days.

(21) Appl. No.: 13/243,382

(22) Filed: Sep. 23, 2011

(65) Prior Publication Data

US 2013/0075595 A1   Mar. 28, 2013

(51) Int. Cl.
*H01J 40/14* (2006.01)
*G01S 7/481* (2006.01)
*G01S 17/02* (2006.01)

(52) U.S. Cl.
CPC ............. *G01S 7/4814* (2013.01); *G01S 17/026* (2013.01)

(58) Field of Classification Search
CPC ......... G01S 17/026; G01S 17/02; G01S 7/48; G01S 7/4814; G01S 7/4813; G01S 7/4811; G01V 8/12; G01V 8/14; H03K 17/9455; H03K 17/945; H03K 17/941; H03K 17/94; H04M 1/0266; H04M 1/026; H04M 1/0202
See application file for complete search history.

(56) References Cited

U.S. PATENT DOCUMENTS

| 5,142,416 | A | 8/1992 | Nakamura et al. |
| 6,166,370 | A | 12/2000 | Sayag |
| 6,835,923 | B2 * | 12/2004 | Hamalainen et al. .... 250/227.11 |
| 7,714,265 | B2 | 5/2010 | Fadell et al. |
| 7,791,015 | B2 | 9/2010 | Chen et al. |
| 8,306,079 | B2 * | 11/2012 | Denney et al. ............. 372/38.02 |
| 8,378,277 | B2 * | 2/2013 | Sandomirsky et al. ...... 244/3.16 |
| 8,487,256 | B2 | 7/2013 | Kwong et al. |
| 8,620,162 | B2 * | 12/2013 | Mittleman .................... 398/106 |
| 8,674,305 | B2 * | 3/2014 | Rossi et al. ................. 250/341.8 |
| 8,912,480 | B2 * | 12/2014 | Pope et al. .................... 250/221 |
| 2003/0094566 | A1 * | 5/2003 | Hamalainen et al. ......... 250/221 |
| 2004/0169929 | A1 | 9/2004 | Sato et al. |
| 2006/0062512 | A1 | 3/2006 | Lee et al. |
| 2009/0139778 | A1 | 6/2009 | Butler et al. |
| 2009/0159900 | A1 * | 6/2009 | Basoor et al. .................... 257/82 |
| 2009/0305742 | A1 * | 12/2009 | Caballero et al. ............. 455/566 |

(Continued)

FOREIGN PATENT DOCUMENTS

| EP | 0384353 | 8/1990 |
| EP | 131322 | 5/2003 |

(Continued)

OTHER PUBLICATIONS

Ruh, U.S. Appl. 13/785,852, filed Mar. 5, 2013.

*Primary Examiner* — John Lee
(74) *Attorney, Agent, or Firm* — Treyz Law Group, P.C.; G. Victor Treyz; Zachary D. Hadd

(57) ABSTRACT

A proximity sensor may be mounted below a display cover layer in an electronic device. The proximity sensor may have a light source that emits light and a detector configured to detect reflections of the emitted light from nearby external objects. Optical structures may be interposed between the proximity sensor and the window in the display cover layer. The optical structures may include a first portion such as a convex lens that is configured to collimate light from the light source so that the light propagates along a surface normal to the display cover layer. The optical structures may also include a second portion such as a prism structure for deflecting uncollimated light away from the propagation axis of the collimated light.

16 Claims, 12 Drawing Sheets

(56) References Cited

U.S. PATENT DOCUMENTS

| | | | |
|---|---|---|---|
| 2010/0149073 A1* | 6/2010 | Chaum et al. | 345/8 |
| 2010/0259766 A1 | 10/2010 | Wiese et al. | |
| 2011/0086676 A1 | 4/2011 | Choi et al. | |
| 2011/0121181 A1 | 5/2011 | Costello et al. | |
| 2011/0235281 A1* | 9/2011 | Mittleman | 361/728 |
| 2012/0037794 A1* | 2/2012 | Lee et al. | 250/216 |
| 2012/0104225 A1 | 5/2012 | McEldowney et al. | |
| 2012/0133956 A1* | 5/2012 | Findlay et al. | 356/614 |
| 2012/0211591 A1* | 8/2012 | Sandomirsky et al. | 244/3.16 |
| 2013/0048837 A1* | 2/2013 | Pope et al. | 250/214.1 |
| 2013/0050677 A1* | 2/2013 | Kwong et al. | 356/51 |
| 2013/0053098 A1* | 2/2013 | Kwong et al. | 455/556.1 |
| 2013/0053106 A1* | 2/2013 | Kwong et al. | 455/566 |
| 2013/0075595 A1* | 3/2013 | Ruh | 250/221 |
| 2013/0153772 A1 | 6/2013 | Rossi et al. | |
| 2013/0284908 A1* | 10/2013 | Rossi et al. | 250/221 |
| 2014/0292658 A1* | 10/2014 | Lee et al. | 345/168 |

FOREIGN PATENT DOCUMENTS

| | | |
|---|---|---|
| JP | 59 125709 | 7/1984 |
| WO | 2009/149023 | 12/2009 |

* cited by examiner

PROXIMITY SENSOR WITH ASYMMETRIC OPTICAL ELEMENT

BACKGROUND

This relates generally to sensors and, more particularly, to proximity sensors for electronic devices.

Some cellular telephones contain proximity sensors. A proximity sensor can detect when a cellular telephone has been brought into proximity to a user's head. When the cellular telephone comes into close proximity to the user's head, touch screen functions in the cellular telephone can be deactivated to avoid unintentional touch input.

A cellular telephone proximity sensor generally contains a light-emitting diode that emits infrared light and a corresponding infrared light sensor that measures the amount of emitted infrared light that is reflected back to the infrared light sensor from the user's head. In some circumstances, such as when a user's hair is dark, the amount of reflected light from the user's head may be relatively small. Unless care is taken, proximity sensor signals will not be sufficiently accurate to properly deactivate a touch screen.

It would therefore be desirable to be able to provide improved proximity sensors for electronic devices.

SUMMARY

An electronic device may be provided with a display. A display cover layer such as a layer of transparent glass or plastic may cover the display. The display may display images for a user of the electronic device in a central active region of the display cover layer. The active region may be surrounded by an inactive display region.

In the inactive region, the underside of the display cover layer may be coated with an opaque masking layer such as a layer of black ink. An opening in the opaque masking layer may be filled with a material such as an infrared-transparent ink to form a window for a light-based proximity sensor.

A light-based proximity sensor may be mounted below the window. The proximity sensor may have a light source such as an infrared light-emitting diode that emits light. The proximity sensor may also have a detector that is configured to detect reflections of emitted light from the light-emitting diode that have reflected off of nearby external objects such as the head of a user.

Optical structures may be interposed between the proximity sensor and the window in the display cover layer. The optical structures may ensure that reflected signals are sufficiently strong without introducing undesirable noise from display cover layer reflections.

The optical structures may include a first portion such as a convex lens that is configured to collimate light from the light source. The collimated light may propagate along a vertical axis that serves as a surface normal to the display cover layer. The collimated light may produce relatively few reflections from the display cover glass that have the potential to lead to noise signals.

The optical structures may also include a second portion such as a prism structure or other light reflecting structure for deflecting light away from the propagation axis of the collimated light. The deflected light may be uncollimated. Use of uncollimated light in illuminating external objects may help increase reflected signal strength. The second portion of the optical structures may be configured so that the deflected light tends not to reflect into the detector to produce noise.

Further features of the invention, its nature and various advantages will be more apparent from the accompanying drawings and the following detailed description of the preferred embodiments.

DETAILED DESCRIPTION

Figure 1:
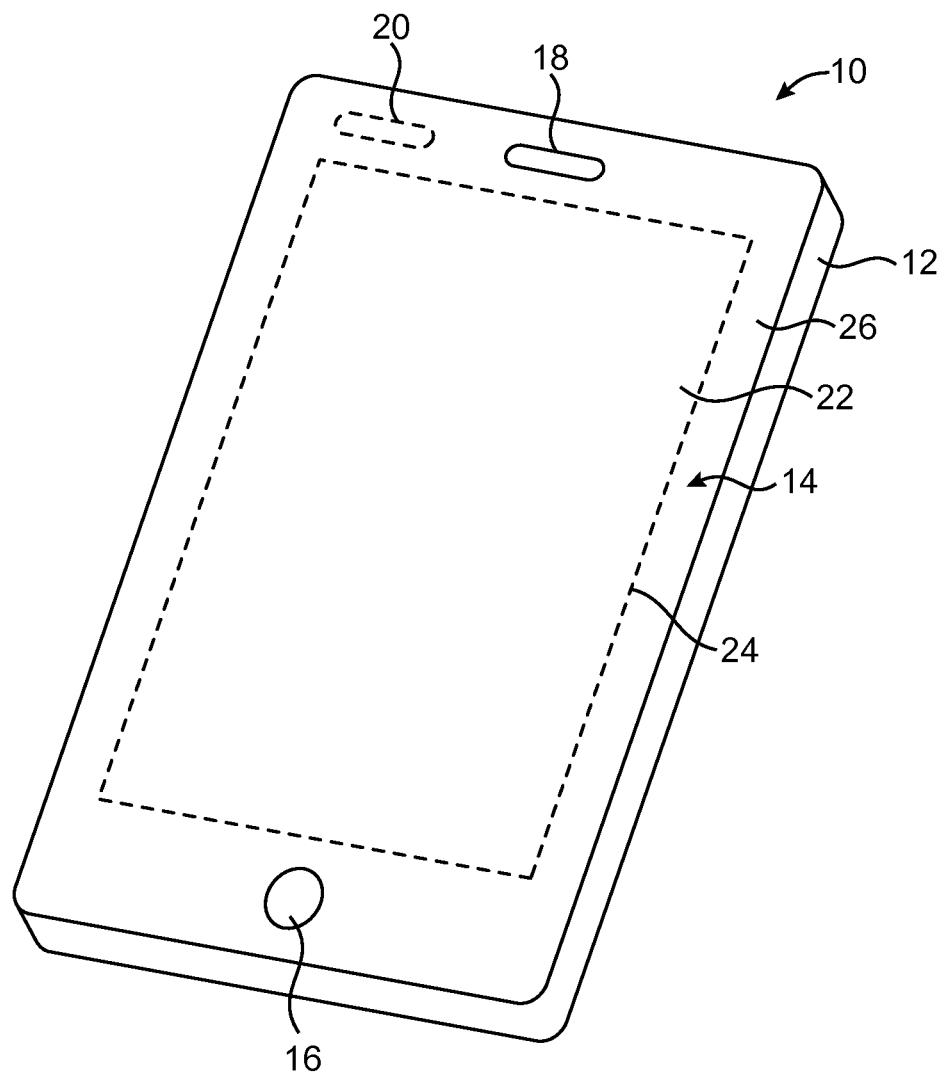
FIG. 1 is a perspective view of an illustrative electronic device with proximity sensor structures in accordance with an embodiment of the present invention.

Electronic devices such as device 10 of FIG. 1 may be provided with proximity sensor components. The proximity sensor components may include light-based proximity sensor components that can be used to make light-based proximity sensor measurements. Proximity sensor data may be used in controlling the operation of device 10. For example, proximity sensor data may be used in controlling touch sensor functions and may be used in controlling other device functions. Device 10 may monitor proximity sensor output during operation of a touch screen and other device features. If the proximity sensor output indicates that an external object such as a user's head is within close proximity to the device, touch sensor functionality may be momentarily deactivated to avoid unintended touch input from the external object.

Device 10 of FIG. 1 may be a portable computer, tablet computer, computer monitor, handheld device, global positioning system equipment, gaming device, cellular telephone, portable computing equipment, or other electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials.

Housing 12 may be formed using an unibody configuration in which some or all of housing 12 is machined or molded as a single structure or may be formed using multiple structures (e.g., an internal frame structure, one or more structures that form exterior housing surfaces, etc.).

In some configurations, housing 12 may be formed using front and rear housing structures that are substantially planar. For example, the rear of device 10 may be formed from a planar housing structure such as a planar glass member, a planar plastic member, a planar metal structure, or other substantially planar structure. The edges (sidewalls) of housing 12 may be straight (vertical) or may be curved (e.g., housing 12 may be provided with sidewalls formed from rounded extensions of a rear planar housing wall). As shown in FIG. 1, the front of device 10 may include a planar display such as display 14 that is covered with a planar cover layer. The cover layer that covers the surface of display 14 may be formed from clear glass, clear plastic, or other transparent materials (e.g., materials that are transparent to visible light and that are generally transparent to infrared light). The cover layer that covers display 14 is sometimes referred to as a display cover layer, display cover glass, or plastic display cover layer.

Display 14 may, for example, be a touch screen that incorporates capacitive touch electrodes or a touch sensor formed using other types of touch technology (e.g., resistive touch, acoustic touch, force-sensor-based touch, etc.). Display 14 may include image pixels formed from light-emitting diodes (LEDs), organic LEDs (OLEDs), plasma cells, electronic ink elements, liquid crystal display (LCD) components, or other suitable image pixel structures.

Display 14 and the cover layer on display 14 may have an active region and an inactive region. Active region 22 of display 14 may lie within rectangular boundary 24. Within active region 22, display pixels such as liquid crystal display pixels or organic light-emitting diode display pixels may display images for a user of device 10. Active display region 22 may be surrounded by an inactive region such as inactive region 26. Inactive region 26 may have the shape of a rectangular ring surrounding active region 22 and rectangular boundary 24 (as an example). To prevent a user from viewing internal device structures under inactive region 26, the underside of the cover layer for display 14 may be coated with an opaque masking layer in inactive region 26. The opaque masking layer may be formed from a layer of ink (e.g., black or white ink or ink of other colors), a layer of plastic, or other suitable opaque masking material.

Device 10 may include input-output ports, buttons, sensors, status indicator lights, speakers, microphones, and other input-output components. As shown in FIG. 1, for example, device 10 may include one or more openings in inactive region 26 of display 14 to accommodate buttons such as button 16 and may include one or more openings such as speaker port opening 18 to accommodate audio components.

Device 10 may include one or more optical components. For example, device 10 may include a light sensor such as visible light sensor that makes measurements on the level of ambient light in the vicinity of device 10. The optical components may also include a light-based proximity sensor. A proximity sensor of this type may emit light and may detect how much of the emitted light is reflected from external objects. Because more light tends to be reflected when external objects are in close proximity to the proximity sensor, the amount of reflected light that is detected by the proximity sensor may be used to determine whether or not external objects are located within the vicinity of the proximity sensor.

A proximity sensor may be mounted on the front or rear surface of device 10, may be mounted on housing sidewalls, or may be mounted in other suitable device locations. With one illustrative arrangement, which is sometimes described herein as an example, a proximity sensor may be located under a portion of inactive region 26. The proximity sensor may, for example, be located under region 20 of inactive region 26. Region 20 may be formed from an opening or other window in inactive region 26.

The proximity sensor may include an infrared light emitter and an infrared light detector. A infrared-transparent material such as "infrared ink" that tends to block visible light while allowing infrared light to pass may be used to cover region 20 (i.e., a proximity sensor window may be formed in region 20 by creating an opening in an opaque masking layer in region 26 and by filling the opening with a layer of infrared-transparent ink).

Figure 2:
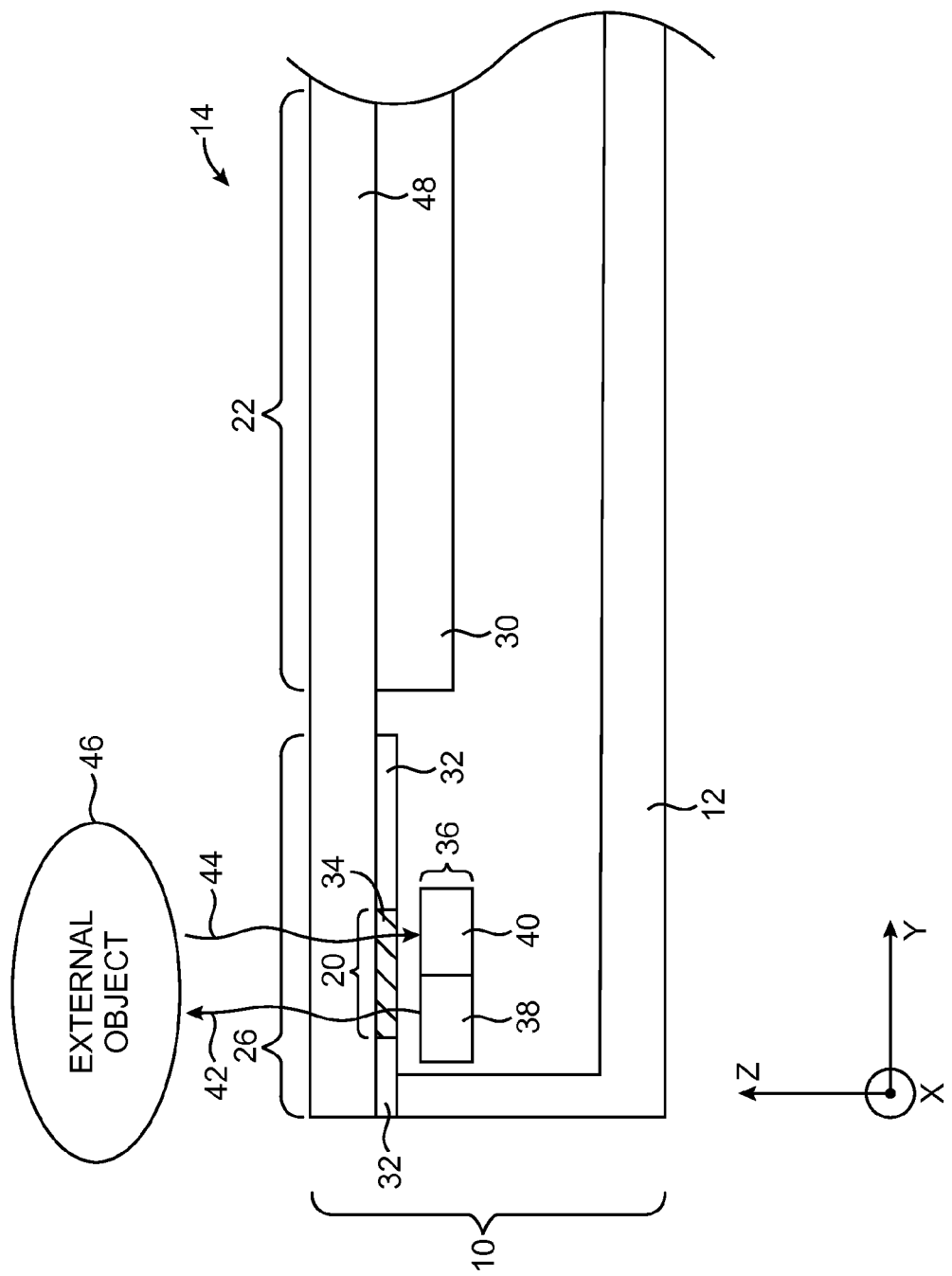
FIG. 2 is a side view of a portion of an electronic device showing where proximity sensor structures and a proximity sensor window for the proximity sensor structures may be formed in accordance with an embodiment of the present invention.

A cross-sectional side view of device 10 in the vicinity of proximity sensor window 20 is shown in FIG. 2. As shown in FIG. 2, display 14 of device 10 may include display structures that generate images such as display module 30. Display module 30 may be an organic light-emitting-diode display module, a liquid crystal display module, or other display structures for generating visible images for a user of device 10. Display module 30 may be mounted within housing 12 (e.g., on the front surface of device 10). Display module 30 may, if desired, include a touch sensor array such as a capacitive touch sensor array or a touch sensor formed using other touch technologies.

Display module 30 may be covered with a cover layer such as cover layer 48. Cover layer 48 may be formed from a clear layer of plastic, a clear (transparent) glass layer, or other suitable transparent layer. The underside of cover layer 48 in inactive region 26 may be provided with an opaque masking layer such as opaque masking layer 32. Opaque masking layer 32 may be formed from a material that is opaque at visible wavelengths such as black ink, black plastic, ink or plastic with other colors (blue, silver, white, etc.), or other suitable opaque material. Opaque masking layer 32 may help block interior device components such as proximity sensor 36 from view through layer 48 by a user of device 10. In active region 22 of display 14, cover layer 48 may be free of opaque masking layer material.

Proximity sensor window 20 may be formed by creating an opening in opaque masking layer 32 and filling the opening with a layer of material such as infrared ink 34 that is able to block at least some visible light while allowing infrared light to be transmitted. Other types of schemes may be used for mounting proximity sensor 36 within housing 12 if desired. The use of an infrared-light-compatible proximity sensor window in opaque masking layer 32 on the underside of a transparent planar member such as display cover layer 48 is merely illustrative.

Proximity sensor 36 may include a light source such as light source 38 and a light detector such as light detector 40. Light source 38 may be, for example, an infrared light-emitting diode that emits light 42. Light 42 may pass through proximity sensor window 20 and the material of cover layer 48. Upon striking the head of a user of device 10 or other external object 46, light 42 may be reflected off of the object, as shown by reflected light 44 in FIG. 2.

Reflected light 44 may be detected using a light detector in proximity sensor 36 such as light detector 40. Light detector 40 may be, for example, a silicon photosensor. By measuring the magnitude of the reflected light signal, proximity sensor 36 may be used to determine whether external object 46 is in the proximity of device 10. For example, the magnitude of reflected light 44 may be compared to a threshold level or may be otherwise processed to ascertain whether external object 46 is sufficiently close to display 14 to warrant actions such as temporary deactivation of the touch sensor functions of display 14.

Light source 38 and light detector 40 may be housed in a common package, may be formed from separately packaged devices that are mounted to a common substrate (e.g., a printed circuit substrate formed from a rigid printed circuit board material such as fiberglass-filled epoxy or a flexible printed circuit substrate material such as a sheet of polyimide or other flexible polymer), or may otherwise be mounted within housing 12.

Figure 4:
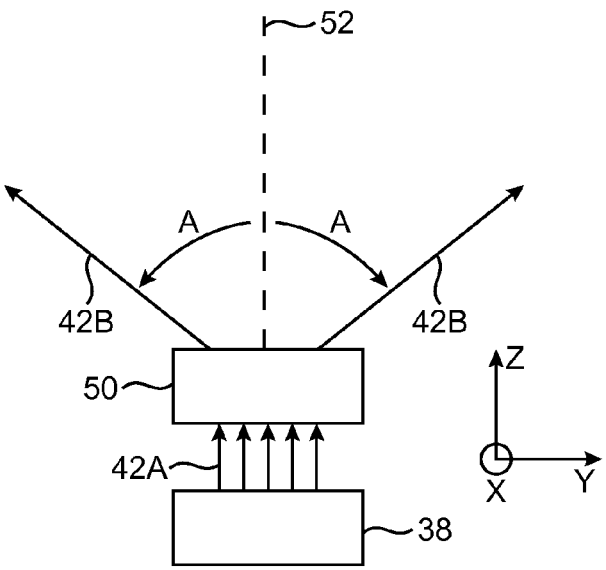
FIG. 4 is a side view of a proximity sensor structure in which optical structures are being used to distribute light in an uncollimated pattern in accordance with an embodiment of the present invention.
Figure 5:
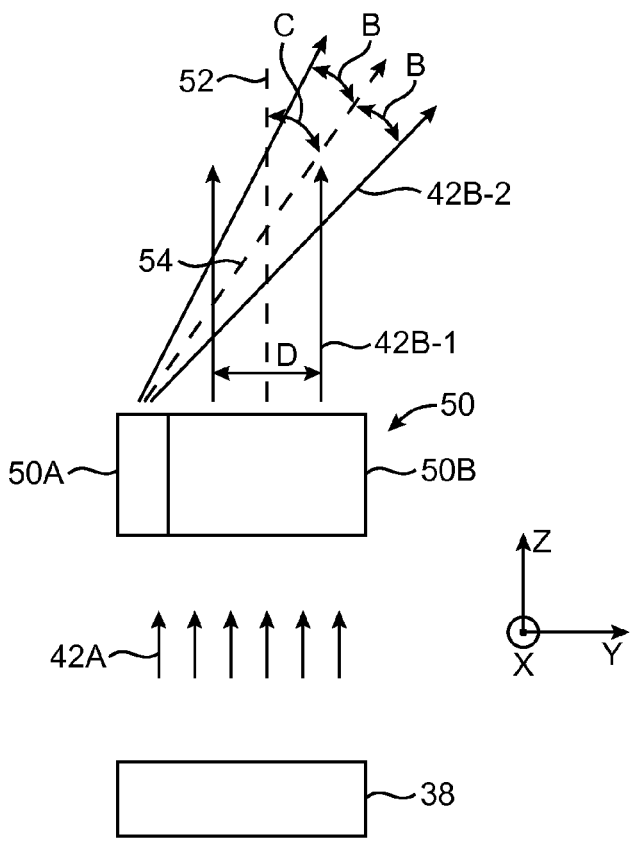
FIG. 5 is a side view of a proximity sensor structure in which optical structures are being used to distribute a first portion of sensor light in an on-axis vertical collimated pattern while distributing a second portion of sensor light with an angular spread in an off-axis direction in accordance with an embodiment of the present invention.

The pattern in which light 42 is emitted from device 10 can affect the performance of sensor 36. Illustrative proximity sensor configurations for device 10 are shown in FIGS. 3, 4, and 5.

Figure 3:
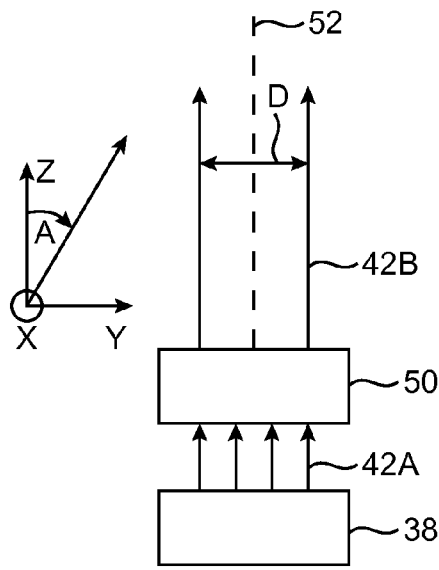
FIG. 3 is a side view of a proximity sensor structure in which optical structures are being used to collimate emitted light in accordance with an embodiment of the present invention.

In a configuration of the type shown in FIG. 3, light may be emitted in a collimated pattern. As shown in FIG. 3, light source 38 may emit light 42A upwards along vertical axis 52 (i.e., an axis that serves as a surface normal for planar display cover layer 48 of FIG. 2). Axis 52 extends parallel to vertical (surface normal) dimension Z. Light 42A may be emitted from light source 38 with an angular spread that is dictated by the type of light-emitting diode or other component that is used for implementing light source 38. As an example, light 42A (e.g., light 42A of FIGS. 3, 4, and 5) may have an angular spread of about 0-40° as the light exits light source 38.

Cover layer 48 (not shown in FIGS. 3, 4, and 5) may lie in the x-y plane. A lens or other optical structures 50 may be used to reduce the angular spread of light 42A. For example, a lens or other optical structures 50 may collimate light 42A or may otherwise refract or direct light 42A to produce patterned light 42B. Patterned light 42B may be collimated light that propagates substantially parallel to axis 52 and is characterized by a uniform lateral dimension D. Axis 52, which may sometimes be referred to as a vertical axis, may form a surface normal for planar display cover layer 48 and may represent the direction of propagation (propagation axis) of collimated light 42B. The angular deviation A of the most divergent light rays in collimated light 42B relative to axis 52 and vertical dimension may be relatively small (i.e., A may be less than 10°, less than 4°, or less than 2°).

The use of collimated light in detecting the presence of external object 46 may help avoid undesirable detector noise that might otherwise arise due to reflections of light 42B from cover layer 48 into detector 40 (e.g., angled-light reflections from the uppermost glass-air or plastic-air interface associated 48. The exclusive use of collimated light may, however, result in relatively low signal strength for the reflected light signal, particularly when light 42B strikes a dark external object.

In a configuration of the type shown in FIG. 4, light may be emitted vertically in an uncollimated (angularly spreading) pattern. As shown in FIG. 4, light source 38 may emit light 42A upwards along vertical axis 52, parallel to vertical dimension Z. A lens or other optical structures 50 may be used to direct light 42A so that light 42A is emitted from device 10 as patterned light 42B. The most divergent light rays in patterned light 42B of FIG. 4 may be characterized by an angular deviation A relative to axis 52 and vertical dimension Z that is relatively large compared to that of collimated light 42B of FIG. 3 (e.g., greater than 10°, greater than 25°, or greater than 40°).

The use of diverging light 42B such as patterned light 42B in the example of FIG. 4 in detecting the presence of external object 46 may help improve the amount of reflected light that is detected by detector 40, but may give rise to undesirable scattered light noise as the divergent light rays are reflected by cover layer 48 (e.g., the uppermost glass-air or plastic-air interface in layer 48) and enter detector 40.

If desired, a configuration of the type shown in FIG. 5 may be used in device 10 to obtain the benefits of both collimated and uncollimated designs. As shown in FIG. 5, a proximity sensor light source such as light source 38 may be used to emit light 42A. Light 42A may pass through optical structures 50. Optical structures 50 may include at least first optical structures 50A (e.g., light deflecting structures such as a prism, mirror, or other light reflector) and second optical structures 50B (e.g., light collimating structures or other light focusing or light refracting structures such as a convex lens).

Examples of optical structures that may be included in optical structures 50 include simple and compound lenses, prisms, mirrors, other light bending and/or light reflecting structures, gratings and other patterned structures for diffracting light, and other optical components. If desired, optical structures 50 may be used in reflecting and refracting light 42A and may therefore sometimes be referred to as catadioptric optical structures or a catadioptric optical system. In general, any suitable structures for reflecting and/or refracting and/or diffracting light may be used in forming optical structures 50.

First optical structures 50A and second optical structures 50B are shown as being formed at laterally adjacent locations in the X-Y plane of FIG. 5. This is merely illustrative. Optical structures 50A and 50B may be implemented using optical structures at any suitable locations in device 10.

Optical structures 50B may reflect and/or refract a portion of light 42A to form collimated light 42B-1. As described in connection with light 42B of FIG. 3, for example, optical structures 50B may produce light 42B-1 that propagates in vertical direction Z along vertical propagation axis 52. If desired, light 42B-1 may be characterized by a relatively small angular spread A away from vertical dimension Z (and propagation axis 52 for collimated light 42B-1), so that light 42B-1 can be used in providing proximity sensing functions without introducing excessive noise due to reflections of light from cover layer 48 towards sensor 40.

As optical structures 50B are being used to produce collimated light 42B-1, optical structures 50A may be used to reflect and/or refract a portion of light 42A to produce uncollimated light 42B-2. Uncollimated light 42B-2 may propagate in an angled propagation direction defined by propagation axis 54. Axis 54 may be oriented at a non-zero angle such as angle C with respect to vertical dimension Z and axis 52. Because light 42B-2 is not collimated (in this example), light 42B-2 will be characterized by a non-zero angular spread away from propagation axis 54. In particular, the most divergent light rays in light 42B-2 may be characterized by an angular deviation B relative to axis 54 that is relatively large. The magnitude of angle B may be, for example, greater than 5°, greater than 10°, greater than 25°, or greater than 40° (as examples). The presence of uncollimated light 42B-2 may help to increase the magnitude of reflected light 44 that is received by light detector 40 in proximity sensor 36. The non-zero angle C of propagation axis 54 with respect to vertical dimension Z and axis 52 may be configured to reduce or eliminate the reception of undesired reflections from cover layer 48 by detector 40.

Figure 6:
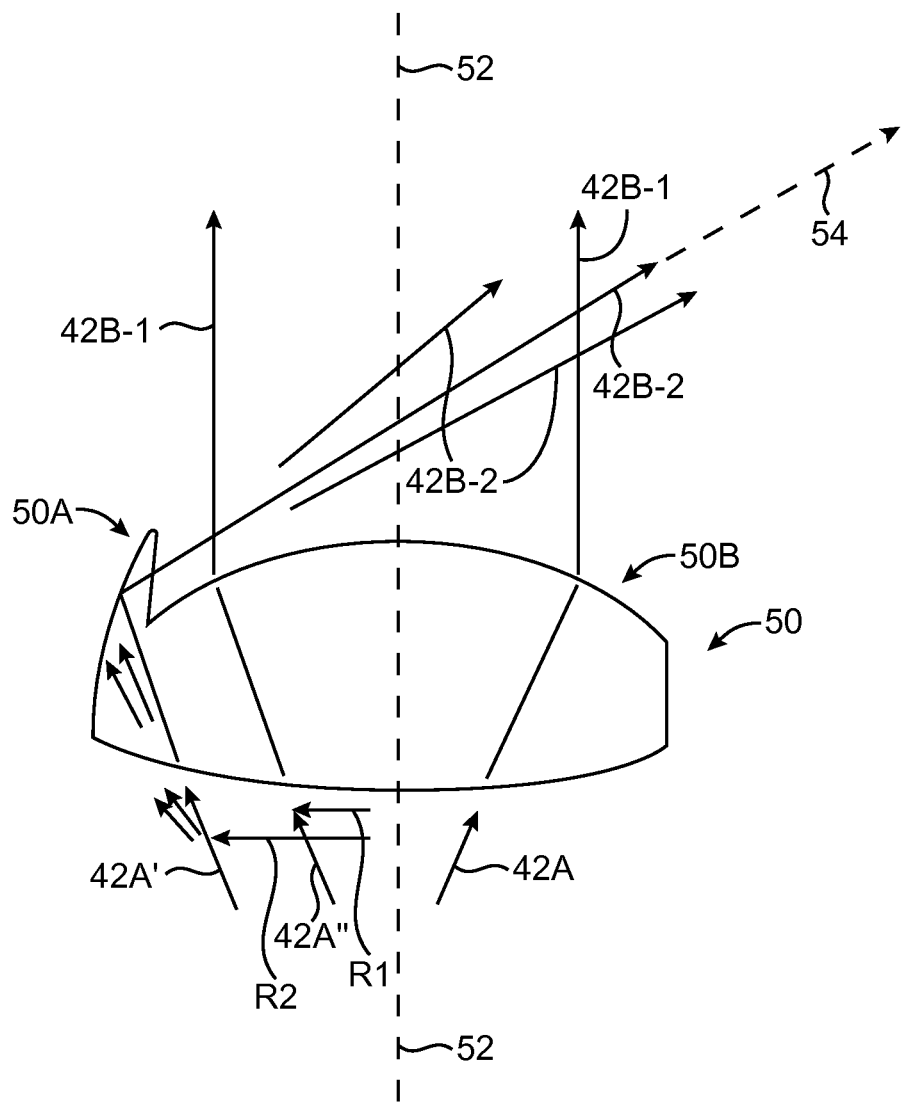
FIG. 6 is a cross-sectional side view of illustrative optical structures for distributing sensor light in both vertical collimated and angled uncollimated patterns in accordance with an embodiment of the present invention.

A cross-sectional side view of an illustrative configuration that may be used for optical structures 50 is shown in FIG. 6. As shown in FIG. 6, optical structures 50 may include lens structure 50B for refracting light 42A and thereby forming collimated light 42B-1. Collimated light 42B-1 may propagate parallel to axis 52. Optical structures 50 may also include prism structure 50A for reflecting light 42A and thereby forming reflected uncollimated light 42B-2 that propagates along propagation axis 54.

In the example of FIG. 6, prism structure 50A is formed from a relatively small edge portion of structures 50 and lens structure 50B is formed from a larger convex lens shaped portion in the middle of structures 50. Structures 50A and 50B may, as an example, be formed from a common molded plastic part. Other arrangements may be used, if desired. For example, structures 50A and structures 50B may consume equal areas or structures 50A may be larger than structures 50B. Structures 50A and structures 50B may be formed from independent optical elements or may be formed from parts of a common optical structure, structure 50A may be formed from a mirror structure that includes metal, a reflective thin-film stack (e.g., a dielectric stack of layers of material with different indices of refraction), or other reflective materials. Structures 50A and 50B may be formed from plastic, glass, ceramic, other materials, or combinations of these materials.

With a configuration of the type shown in FIG. 6, the location at which light 42A strikes structures 50 affects how light 42A is routed by optical structures 50. Light rays 42A such as light ray 42A" that are located at a radial distance R1 from longitudinal axis 52 of optical structures 50 may, for example, strike portion 50B of structures 50 and may, following refraction by the material of portion 50B, become part of collimated light 42B-1. Light rays 42A such as light ray 42A' that are located at a larger radial distance such as radial distance R2 from longitudinal axis 52 may, strike portion 50A of structures 50 and may, following reflection by the material of portion 50A, become part of uncollimated light 42B-1.

Figure 7:
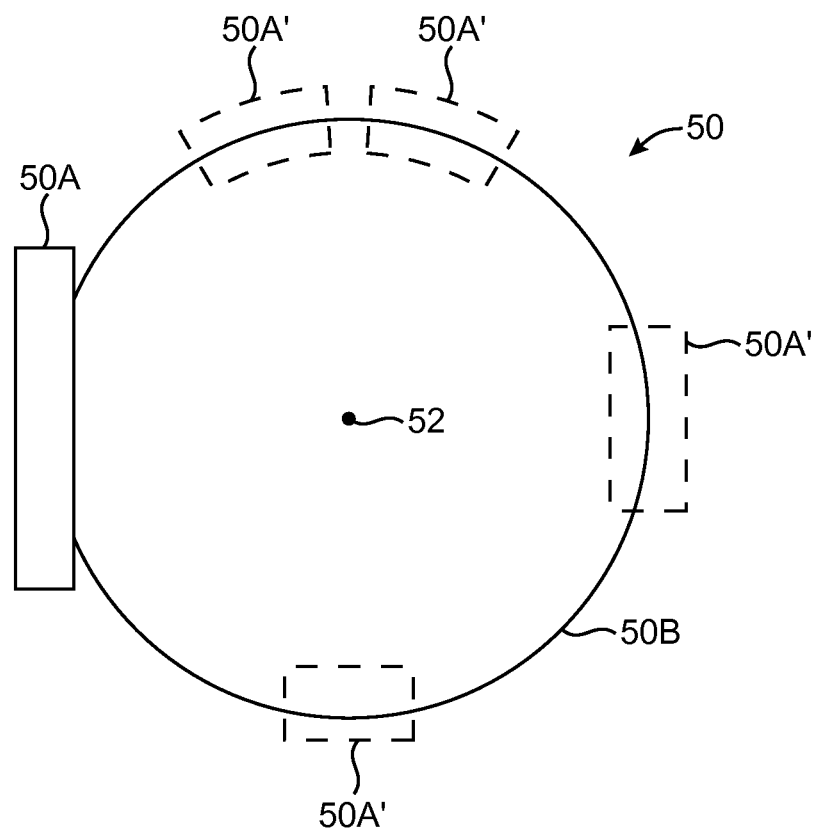
FIG. 7 is a top view of the illustrative optical structures of FIG. 6 in accordance with an embodiment of the present invention.

FIG. 7 is a top view of optical structures 50 of FIG. 6. As shown in FIG. 7, prism structures 50A may be located on one side of structures 50B (as an example). In this type of arrangement structures 50B may be rotationally symmetric about rotational (vertical) axis 52 while overall, structures 50 are rotationally asymmetric about axis 52 (i.e., the portions of structures 50 that are used in deflecting light along path 54 and that are used in collimating refracting light are not, taken together, rotationally symmetric around axis 52). If desired, a configuration may be used for structures 50 in which structures 50A are incorporated into structures 50 in other locations. For example, some or all of structures 50A may be placed in the locations shown by dashed lines 50A' (as examples).

Figure 8:
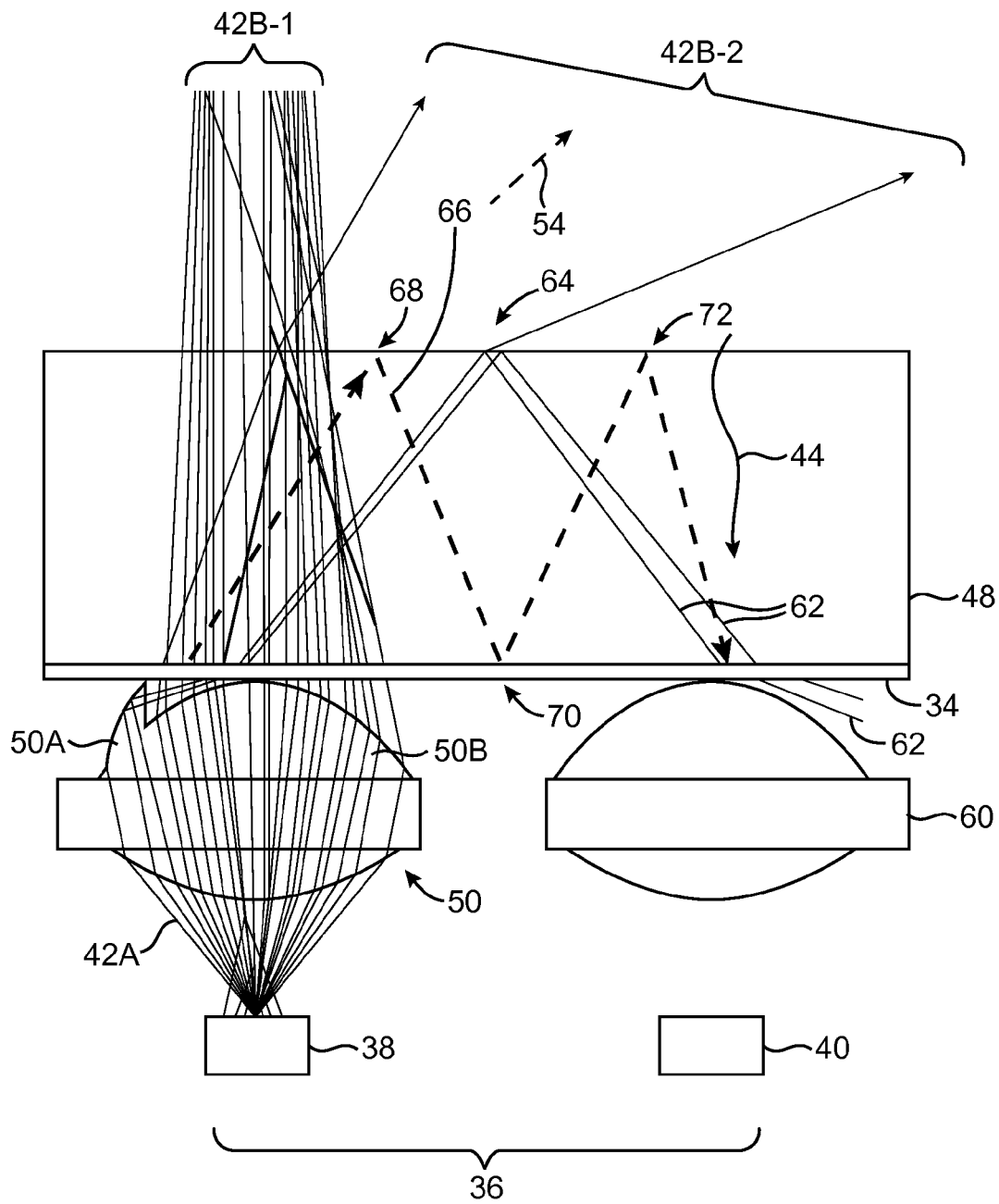
FIG. 8 is a cross-sectional side view of a proximity sensor under a portion of a sensor window in an electronic device in a configuration in which the proximity sensor emitter has associated optical structures for distributing sensor light in both on-axis collimated and off-axis uncollimated patterns in accordance with an embodiment of the present invention.

FIG. 8 is a cross-sectional side view of device 10 showing how optical structures such as optical structures 50 of FIGS. 6 and 7 may be used to direct emitted light 42A from light source 38 through a proximity sensor window such as a window formed from infrared-transparent ink 34 and cover layer 48. Light 42A that strikes structures 50B will be collimated by structures 50B and may exit structures 50B and cover layer 48 as collimated light 42B-1. Light 42A that strikes structures 50A will be reflected by structures 50A and may exit structures 50A and cover layer 48 as uncollimated light 42B-2.

Structures 50A may be configured to minimize light reflection into lens 60 and associated light detector 40 of proximity detector 36. The configuration of structures 50A may produce certain rays of reflected light such as light ray 66 that have the potential to reach lens 60 and thereby be detected by light detector 40. However, as illustrated in FIG. 8, these light rays (e.g., light ray 66 of FIG. 8) reflect from the air-glass (or air-plastic) interfaces in cover layer 48 three times (at locations 68, 70, and 72). Due to these multiple reflections, the intensity of light ray 66 will generally be reduced to a negligible level.

Other light rays such as rays 62 of FIG. 8 may have the potential to reach the vicinity of lens 60 with only one cover layer reflection (e.g., a reflection at location 64). Because only a single reflection is involved in cover layer 48 for light rays 62, the intensity of light rays 62 will tend to be larger than the intensity of light ray 66. Nevertheless, due to the locations of optical structures 50 and 60 and the direction of propagation of light rays 62 upon exiting prism structures 50A and cover layer 48, light rays 62 will not be collected by the lens formed from optical structures 60. As a result, light rays 62 will not be focused onto light detector 40 and will not be detected by light detector 60. Light rays 62 will therefore not contribute to reflected light noise in proximity sensor 36. If desired, undesired reflections into detector 40 can be further reduced by incorporating antireflection coatings into layer 48 (e.g., on the outer surface of layer 48). In configurations in which antireflection coatings are omitted (e.g., to minimize cost, to improve device aesthetics, and/or to avoid challenges associated with implementing an antireflection structure that is effective over a wide range of angles), the use of structures that direct light rays 62 away from light detector 40 may be helpful in minimizing undesired reflected light noise.

By configuring optical structures 50 so that a portion of light 42A is collimated by structures 50B and serves as collimated light 42B-1, the potential for undesired light reflections from cover layer 48 that could lead to noise at detector 40 may be minimized. By ensuring that a fraction of light 42A is spread out in an uncollimated fashion after exiting structures 50A and cover layer 48 may help ensure that reflected light 44 from external object 46 is sufficiently strong. During proximity sensor operations, light 44 may be focused onto light detector 40 and used to determine whether or not external object 46 is in proximity to device 10. Structures 50A may be configured so that the angle at which light 42B-2 exits cover layer 48 (i.e., propagation direction 54) is at a non-zero angle with respect to vertical dimension Z. The magnitude of the non-zero angle may be selected to cause light reflected from cover layer 48 to experience multiple reflections that diminish its intensity or to avoid striking lens 60 entirely and to thereby avoid being detected by light detector 40.

Figure 9:
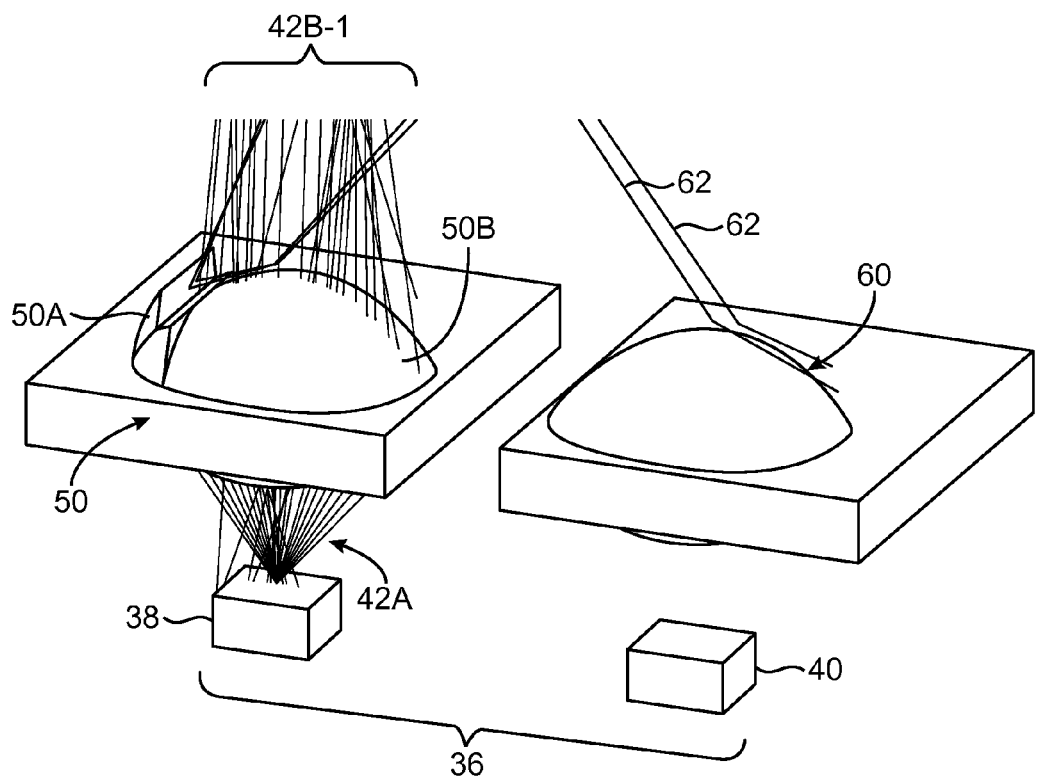
FIG. 9 is a perspective view of the optical structures of FIG. 8 and an associated proximity sensor emitter and detector in accordance with an embodiment of the present invention.

FIG. 9 is a perspective view of optical structures 50 and 60 and proximity sensor 36 of FIG. 8. Optical structures 50 and 60 may be formed from molded plastic, glass, or other optical materials. Reflective optical structures may be formed using reflective materials such as metal, using dielectric structures such as prism structures that reflect light when the light reaches a solid-air interface, using reflective structures formed using thin-film stacks, or other reflective structures.

Figure 10:
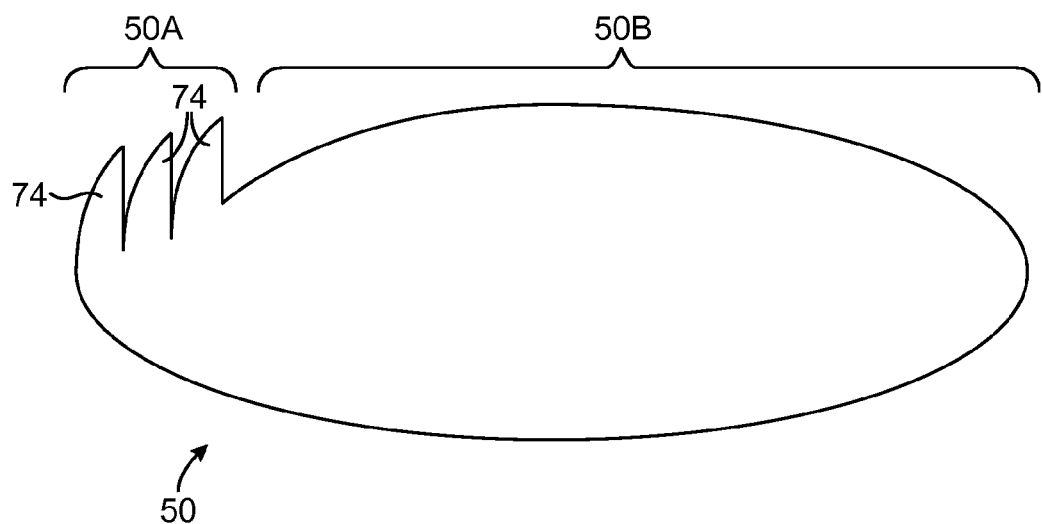
FIG. 10 is a cross-sectional side view of illustrative optical structures in which a reflecting structure for distributing emitted light in an uncollimated off-axis pattern has been formed from multiple protruding structures along one side of a convex lens in accordance with an embodiment of the present invention.

If desired, structures 50A may be formed from multiple protrusions 74 as shown in FIG. 10. The protruding portions of optical structures 50 that form illustrative optical structures 50A of FIG. 10 may, for example, be protrusions of glass or plastic (e.g., Fresnel structures) that are integral portions of structures 50 and that collectively create an optical structure for reflecting a portion of light 42A in a non-vertical direction such as direction 54 of FIG. 8 while spreading the reflected light in an uncollimated pattern.

Figure 11:
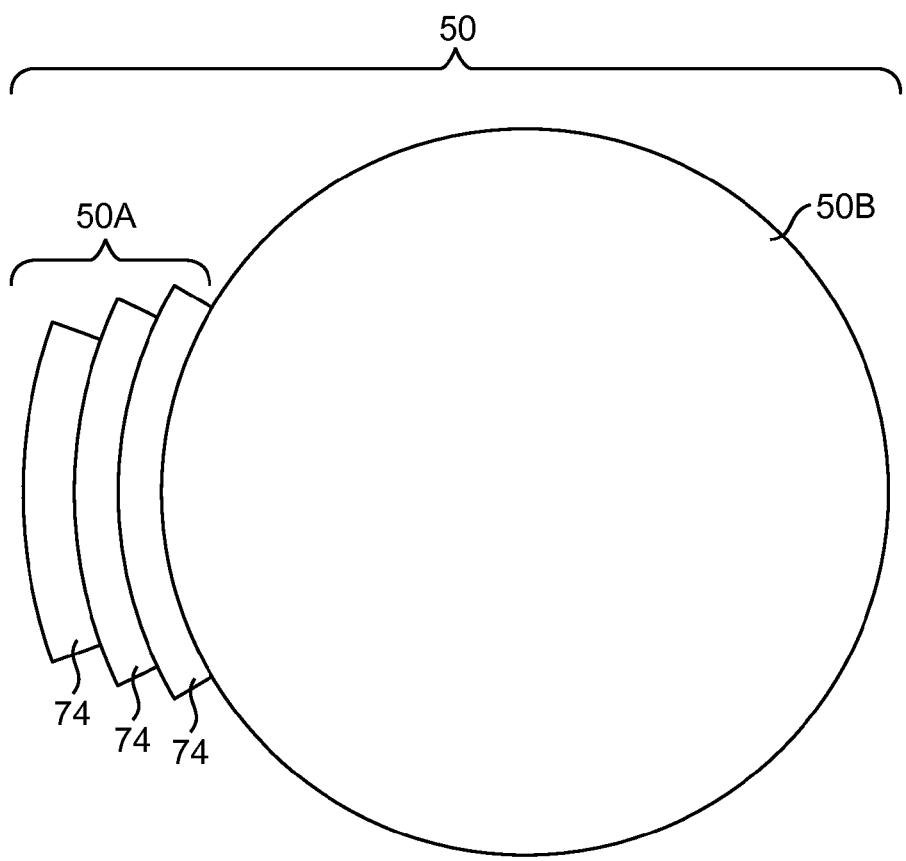
FIG. 11 is a top view of the illustrative optical structures of FIG. 10 in accordance with an embodiment of the present invention.

FIG. 11 is a top view of optical structures 50 of the type shown in FIG. 10. If desired, optical structures 50A of FIG. 11 may be located elsewhere among structures 50, as described in connection with locations 50A' of FIG. 7.

Figure 12:
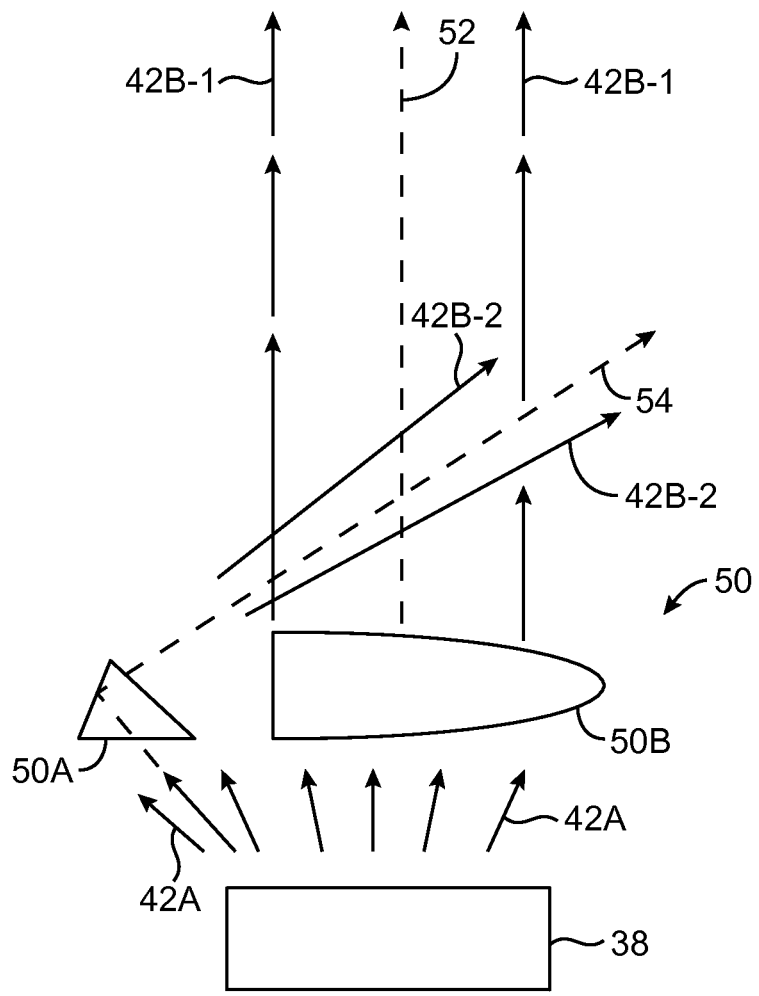
FIG. 12 is a cross-sectional side view of illustrative proximity sensor optical structures that have first and second optical elements for distributing sensor light in both vertical collimated and angled uncollimated patterns in accordance with an embodiment of the present invention.

As shown in FIG. 12, optical structures 50 may be formed from prism structures 50A or other light reflecting (or refracting) light deflection structures that are separate from optical structures 50B. Separate optical elements for forming structures 50A and 50B may be mounted in a unitary package or may be mounted using separate mounting structures. Optical elements 50A and 50B may both be formed from glass, may both be formed from plastic, or may both be formed from other suitable materials. If desired, optical elements 50A and 50B may be formed from different materials. For example, optical element 50A may be formed from a glass prism and optical element 50B may be formed from a molded plastic lens. As another example, optical element 50A may be formed from a reflective metal surface or a reflector constructed from a thin-film stack and optical element 50B may be formed from a molded plastic lens or a glass lens.

Figure 13:
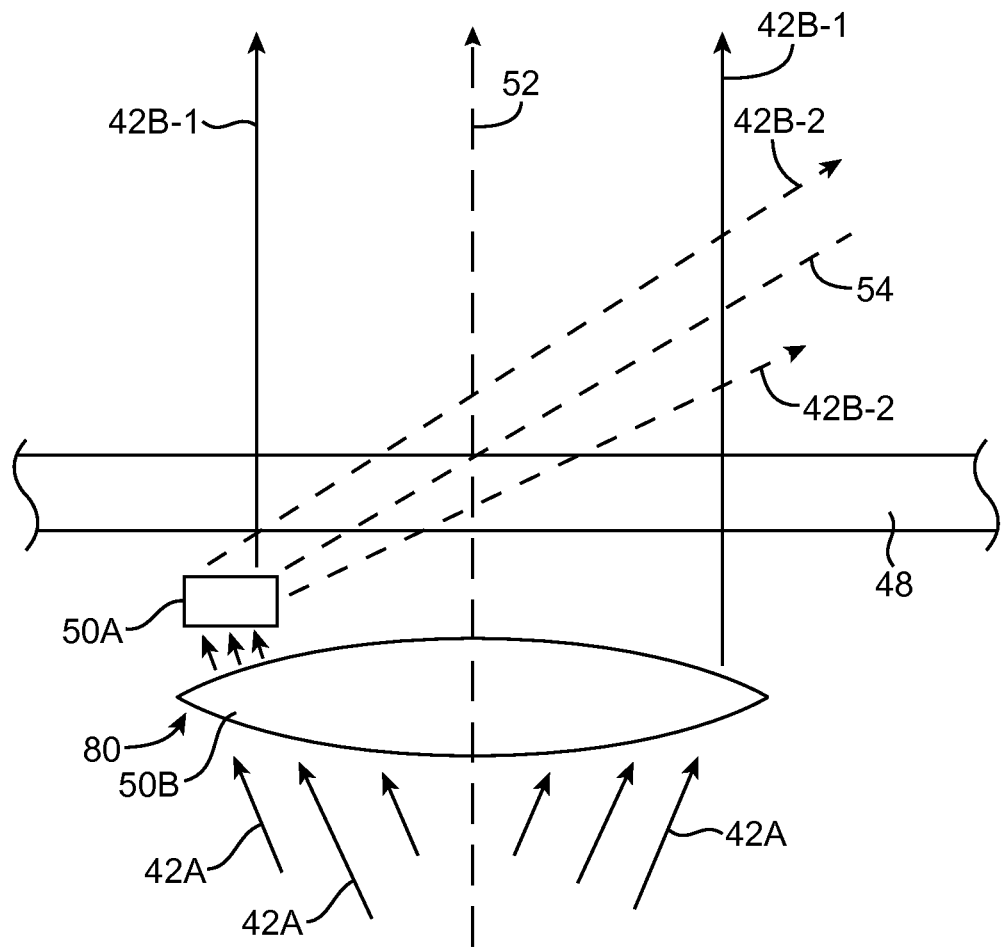
FIG. 13 is a cross-sectional side view of an illustrative optical configuration for a proximity sensor in which optical structures for distributing sensor light in both vertical collimated and angled uncollimated patterns are formed using overlapping first and second optical elements in accordance with an embodiment of the present invention.

In the illustrative arrangement of FIG. 12, optical structures 50B and optical structures 50A have been formed from separate structures that each separately received light 42A directly from light source 38. If desired, structures 50A and 50B may optically overlap so that light passes through one of the structures and then the other in series. This type of arrangement is shown in FIG. 13. As shown in FIG. 13, light 42A may pass through edge portion 80 of optical structures 50B before passing through optical structures 50A. Upon reaching structures 50A, light 42A may be deflected along path 54 to become uncollimated light 42B-2. Light 42A that strikes other portions of structures 50B may be collimated by structures 50B to form collimated light 42B-1.

If desired, optical structures 50 may include structures 50B that do not completely collimate light 42A. For example, optical structures 50 may have structures such as structures 50A that deflect uncollimated light along a path such as path 54 and may have structures 50B that gather light into a less divergent (but potentially still uncollimated) pattern of light. In this type of arrangement, optical structures 50A may deflect light in a path that avoids reflecting light from cover layer 48 into sensor 40 while optical structures 50B may direct light along a propagation direction such as vertical axis 52 towards external object 46 without excessive light divergence (e.g., with an angular spread characterized by an angle A relative to axis 52 that is less than 30°).

Figure 14:
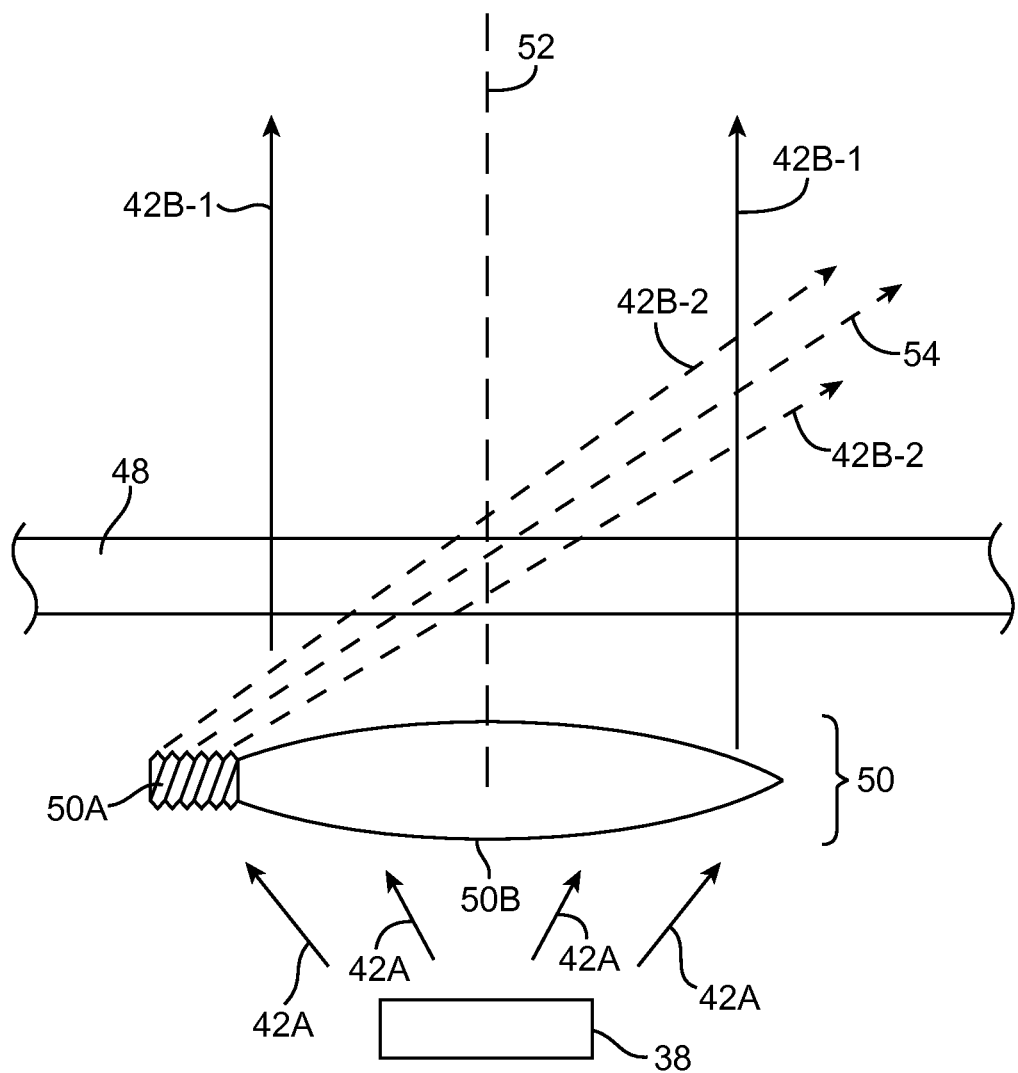
FIG. 14 is a cross-sectional side view of an illustrative optical configuration for a proximity sensor in which optical structures for distributing sensor light in both vertical collimated and angled uncollimated patters are formed using a lens structure and diffractive optical element in accordance with an embodiment of the present invention.

FIG. 14 is a cross-sectional side view of an illustrative optical configuration for a proximity sensor in which optical structures 50 include a diffractive optical element. Optical structures 50 may, for example, include a lens or other optical structures 50B that collimate light 42A to produce light 42B-1 and may include a grating or other diffractive optical element such as optical structures 50A. In the example of FIG. 14, optical structures 50A and optical structures 50B have been formed from separate structures that each separately received light 42A directly from light source 38. If desired, structures 50A and 50B may optically overlap so that light passes through one of the structures and then the other in series, as described in connection with FIG. 13.

Diffractive optical element 50A may include a grating or optical slit that is formed from patterned metal structures, diffractive structures that are formed by modulating the index of refraction of dielectric materials, gratings, slits, and other diffracting structures formed from opaque substances such as ink, plastic, thin-film layers of dielectric and metal, or any other structures capable of diffracting light 42A and thereby deflecting the light from emitter 38 so that resulting deflected light 42B-1 travels along a desired path. As shown in FIG. 14, light 42A that has passed through diffractive optical structures 50A may, for example, be deflected to form uncollimated deflected light 42B-2 that travels in a direction centered along path 54.

The foregoing is merely illustrative of the principles of this invention and various modifications can be made by those skilled in the art without departing from the scope and spirit of the invention.

What is claimed is:

1. Apparatus, comprising:
 a light-based proximity sensor including a light source and a light detector; and
 optical structures through which light from the light source passes, wherein the optical structures include light collimating structures and light deflecting structures, and wherein the light deflecting structures are configured to deflect light onto an object external to the apparatus.

2. The apparatus defined in claim 1 wherein the light collimating structures include lens structures that collimate the light from the light source to produce collimated light.

3. The apparatus defined in claim 2 wherein the collimated light propagates along a first axis and wherein the light deflecting structures are configured to deflect light from the light source to produce deflected light that propagates along a second axis that is oriented at a non-zero angle with respect to the first axis.

4. The apparatus defined in claim 3 wherein the optical structures are configured such that the deflected light comprises uncollimated light.

5. The apparatus defined in claim 4 wherein the light collimating structures comprise a convex lens.

6. The apparatus defined in claim 5 wherein the light deflecting structures comprise prism structures.

7. The apparatus defined in claim 6 wherein the convex lens and the prism structures are formed from a unitary molded plastic member.

8. The apparatus defined in claim 3 wherein the light source comprises an infrared light-emitting diode and wherein the light deflecting structures comprise prism structures.

9. The apparatus defined in claim 3 wherein the light collimating structures comprise a lens, wherein the light deflecting structures comprise a light reflector, and wherein the deflected light comprises uncollimated light.

10. The apparatus defined in claim 9 wherein the light reflector comprises a prism.

11. The apparatus defined in claim 1 wherein the wherein the light deflecting structures comprise a diffractive optical element.

12. An electronic device, comprising:
a display layer;
a proximity sensor having a light source and a light detector;
a lens structure interposed between the light source and the display layer, wherein the lens structure is configured so that light emitted from the light source passes through the lens structure and the display layer and propagates along an axis; and
a light deflecting structure configured to deflect light from the light source through the display layer in a direction away from the axis.

13. The electronic device defined in claim 12 wherein the light deflecting structures are configured to deflect the light from the light source to produce uncollimated light and wherein the display layer comprises a layer selected from the group consisting of: a display cover glass layer and a plastic display cover layer.

14. The electronic device defined in claim 13 wherein the light source comprises a light-emitting diode.

15. The electronic device defined in claim 14 wherein the lens structure comprises a convex lens structure and wherein the light deflecting structure comprises a prism.

16. The electronic device defined in claim 15 wherein the prism and the convex lens structure form portions of a common molded plastic structure and wherein the electronic device further comprises an infrared-transparent ink layer on the display layer through which collimated light from the convex lens structure and deflected uncollimated light from the prism pass.

* * * * *